US011727147B2

(12) United States Patent
Epasto et al.

(10) Patent No.: US 11,727,147 B2
(45) Date of Patent: Aug. 15, 2023

(54) SYSTEMS AND METHODS FOR ANONYMIZING LARGE SCALE DATASETS

(71) Applicant: Google LLC, Mountain View, CA (US)

(72) Inventors: Alessandro Epasto, New York, NY (US); Hossein Esfandiari, Jersey City, NJ (US); Vahab Seyed Mirrokni, Hoboken, NJ (US); Andres Munoz Medina, Mountain View, CA (US); Umar Syed, Rahway, NJ (US); Sergei Vassilvitskii, New Jersey, NJ (US)

(73) Assignee: GOOGLE LLC, Mountain View, CA (US)

( * ) Notice: Subject to any disclaimer, the term of this patent is extended or adjusted under 35 U.S.C. 154(b) by 381 days.

(21) Appl. No.: 17/016,788

(22) Filed: Sep. 10, 2020

(65) Prior Publication Data

US 2022/0075897 A1 Mar. 10, 2022

(51) Int. Cl.
*G06F 16/00* (2019.01)
*G06F 21/62* (2013.01)
*G06N 20/00* (2019.01)
*G06F 16/28* (2019.01)

(52) U.S. Cl.
CPC ........ *G06F 21/6254* (2013.01); *G06F 16/285* (2019.01); *G06N 20/00* (2019.01)

(58) Field of Classification Search
CPC ........................... G06F 16/285; G06F 21/6254
USPC ......................................................... 707/737
See application file for complete search history.

(56) References Cited

U.S. PATENT DOCUMENTS

| 8,661,423 B2* | 2/2014 | Agrawal | G06F 21/566 707/706 |
| 2010/0114920 A1* | 5/2010 | Srivastava | G06F 21/6254 707/707 |
| 2014/0172854 A1* | 6/2014 | Huang | G06F 21/6245 707/737 |
| 2015/0169895 A1* | 6/2015 | Gkoulalas-Divanis | G06F 21/6227 726/26 |

(Continued)

OTHER PUBLICATIONS

Aggarwal et al., "Approximation Algorithms for k-Anonymity", Journal of Privacy Technology, Nov. 2005, 18 pages.

(Continued)

*Primary Examiner* — Alexandria Y Bromell
(74) *Attorney, Agent, or Firm* — Dority & Manning, P.A.

(57) ABSTRACT

A computer-implemented method for k-anonymizing a dataset to provide privacy guarantees for all columns in the dataset can include obtaining, by a computing system including one or more computing devices, a dataset comprising data indicative of a plurality of entities and at least one data item respective to at least one of the plurality of entities. The computer-implemented method can include clustering, by the computing system, the plurality of entities into at least one entity cluster. The computer-implemented method can include determining, by the computing system, a majority condition for the at least one entity cluster, the majority condition indicating that the at least one data item is respective to at least a majority of the plurality of entities. The computer-implemented method can include assigning, by the computing system, the at least one data item to the plurality of entities in an anonymized dataset based at least in part on the majority condition.

20 Claims, 3 Drawing Sheets

(56) References Cited

U.S. PATENT DOCUMENTS

2020/0019728 A1* 1/2020 Rolle .................. G06F 21/6254 707/707

OTHER PUBLICATIONS

Ahmadian et al., "Improved Approximation Guarantees for Lower-Bounded Facility Location", arXiv:1104.3128v2, Aug. 29, 2012, 17 pages.

Albert et al., "Statistical Mechanics of Complex Networks", arXiv:cond-mat/0106096v1, Jun. 6, 2001, 54 pages.

Backstrom et al., "Four Degrees of Separation", Fourth Annual ACM Web Science Conference, Jun. 22-24, 2012, Evanston, Illinois, 10 pages.

Bassily et al., "Coupled-Worlds Privacy: Exploiting Adversarial Uncertainty in Statistical Data Privacy", IEEE Symposium on Foundations of Computer Science (FOCS), Nov. 16-19, 2020, Durham, North Carolina, 10 pages.

Byun et al., "Efficient k-Anonymization Using Clustering Techniques", International Conference on Database Systems for Advanced Applications, Apr. 9-12, 2007, Bangkok, Thailand, pp. 188-200.

Chaudhuri et al., "Differentially Private Empirical Risk Minimization", Journal of Machine Learning Research, vol. 12, 2011, pp. 1069-1109.

Cheng et al., "K-Isomorphism: Privacy Preserving Network Publication against Structural Attacks", ACM SIGMOD/PODS Conference, Jun. 6-11, 2010, Indianapolis, Indiana, 12 pages.

Chierichetti et al., "On Compressing Social Networks", ACM SIGKDD International Conference on Knowledge Discovery and Data Mining, Jun. 28-Jul. 1, 2009, Paris France, 9 pages.

Dwork et al., "Differential Privacy for Statistics: What we Know and What we Want to Learn", Journal of Privacy and Confidentiality, vol. 1, No. 2, 2009, pp. 135-154.

Dwork et al., "The Algorithmic Foundations on Differential Privacy", Foundations and Trends in Theoretical Computer Science, vol. 9, Nos. 3-4, 2014, 281 pages.

Elias et al., "Differentially Private Release of Synthetic Graphs", ACM-SIAM Symposium on Discrete Algorithms (SODA20), Jan. 5-8, 2020, Salt Lake City, Utah, 29 pages.

Fotakis, "Online and Incremental Algorithms for Facility Location", ACM SIGACT New, vol. 42, No. 1, Mar. 2011, 31 pages.

Friedman et al., "An Algorithm for Finding Best Matches in Logarithmic Expected Time", Transactions on Mathematical Software (TOMS), vol. 3. No. 3, 1977, 38 pages.

Ganta et al., "Composition Attacks and Auxiliary Information in Data Privacy", 14th ACM SIGKDD International Conference on Knowledge Discovery & Data Mining, Aug. 24-27, 2008, Las Vegas, NV, 11 pages.

Guha et al., "Hierarchical Placement and Network Design Problems", $41^{st}$ Annual Symposium on Foundations of Computer Science, Nov. 12-14, 2000, Redondo Beach, CA, 10 pages.

Karger et al., "Building Steiner Trees with Incomplete Global Knowledge", $41^{st}$ Annual Symposium on Foundations of Computer Science, Nov. 12-14, 2000, Redondo Beach, CA, 12 pages.

Kasiviswanathan et al., "Analyzing Graphs with Node Differential Privacy", $10^{th}$ Theory of Cryptography Conference (TCC 2013), Mar. 3-6, 2013, Tokyo, Japan, 20 pages.

Kasiviswanthan et al., "What Can We Learn Privately?", arXiv:0803.0924v3, Feb. 19, 2010, 35 pages.

Kenig el al., "A Practical Approximation Algorithm for Optimal k-Anonymity", Data Mining and Knowledge Discovery, Vo. 25, No. 1, Jul. 2012, 34 pages.

LeFevre et al., "Mondrian Multidimensional K-Anonymity", $22^{nd}$ International Conference on Data Engineering (ICDE '06), Apr. 3-8, 2006, Atlanta, GA, 11 pages.

Leskovec et al., "Community Structure in Large Networks: Natural Cluster Sizes and the Absence of Large Well-Defined Clusters", arXiv:0810.1355v1, Oct. 8, 2008, 66 pages.

Leskovec et al., "Graph Evolution: Densification and Shrinking Diameters", ACM Transactions on Knowledge Discovery from Data (TKDD), vol. 1, No. 1, Mar. 2007, 41 pages.

Li et al., "Provably Private Data Anonymization: Or, k-Anonymity Meets Differential Privacy", arXiv:1101.2604v1, Jan. 13, 2011, 12 pages.

Li et al., "t-Closeness: Privacy Beyond k-Anonymity and 1-Diversity", IEEE $23^{rd}$ International Conference on Data Engineering, Apr. 15-20, 2007, Istanbul, Turkey, 10 pages.

Li, "A 1.488 Approximation Algorithm for the Uncapacitated Facility Location Problem" Information and Computation, vol. 222, 2013, 24 pages.

Machanavajjhala et al,. "1-Diversity: Privacy Beyond k-Anonymity", ACM Transactions on Knowledge Discovery from Date (TKDD), vol. 1, No. 1, Mar. 2007, 53 pages.

Meyerson et al., "On the Complexity of Optimal K-anonymity", Twenty-Third ACM SIGMOD-SIGACT-SIGART Symposium on Principles of Database Systems, Jun. 14-16, 2004, Paris, France, 6 pages.

Meyerson, "Online Facility Location", $42^{nd}$ IEEE Symposium on Foundations of Computer Science, Oct. 14-17, 2001, Las Vegas, NV, 6 pages.

Narayanan et al., "Robust De-anonymization of Large Sparse Datasets", IEEE Symposium on Security and Privacy, May 18-21, 2008, Oakland, CA, 15 pages.

Nguyen et al., "Network Structure Release under Differential Privacy", Transactions on Data Privacy, vol. 9, No. 3, 2016, pp. 215-241.

Nissim et al., "Smooth Sensitivity and Sampling in Private Data Analysis", $39^{th}$ Symposium on Theory of Computing, Jun. 11-13, 2007, San Diego, CA, 34 pages.

Svitkina, "Lower-Bounded Facility Location", ACM Transactions on Algorithms, vol. 6, No. 4, 2010, 10 pages.

Sweeney, "k-Anonymity: A Model For Protecting Privacy", International Journal on Uncertainty, Fuzziness, and Knowledge-based Systems, vol. 10, No. 5, 2002, 14 pages.

Yang et al., "Defining and Evaluating Network Communities based on Ground-truth", Knowledge and Information Systems, vol. 42, No. 1, 10 pages.

Zheng et al., "K-Anonymity Algorithm based on Improved Clustering", International Conference on Algorithms and Architectures for Parallel Processing, Nov. 15-17, 2018, Guangzhou, China, 15 pages.

* cited by examiner

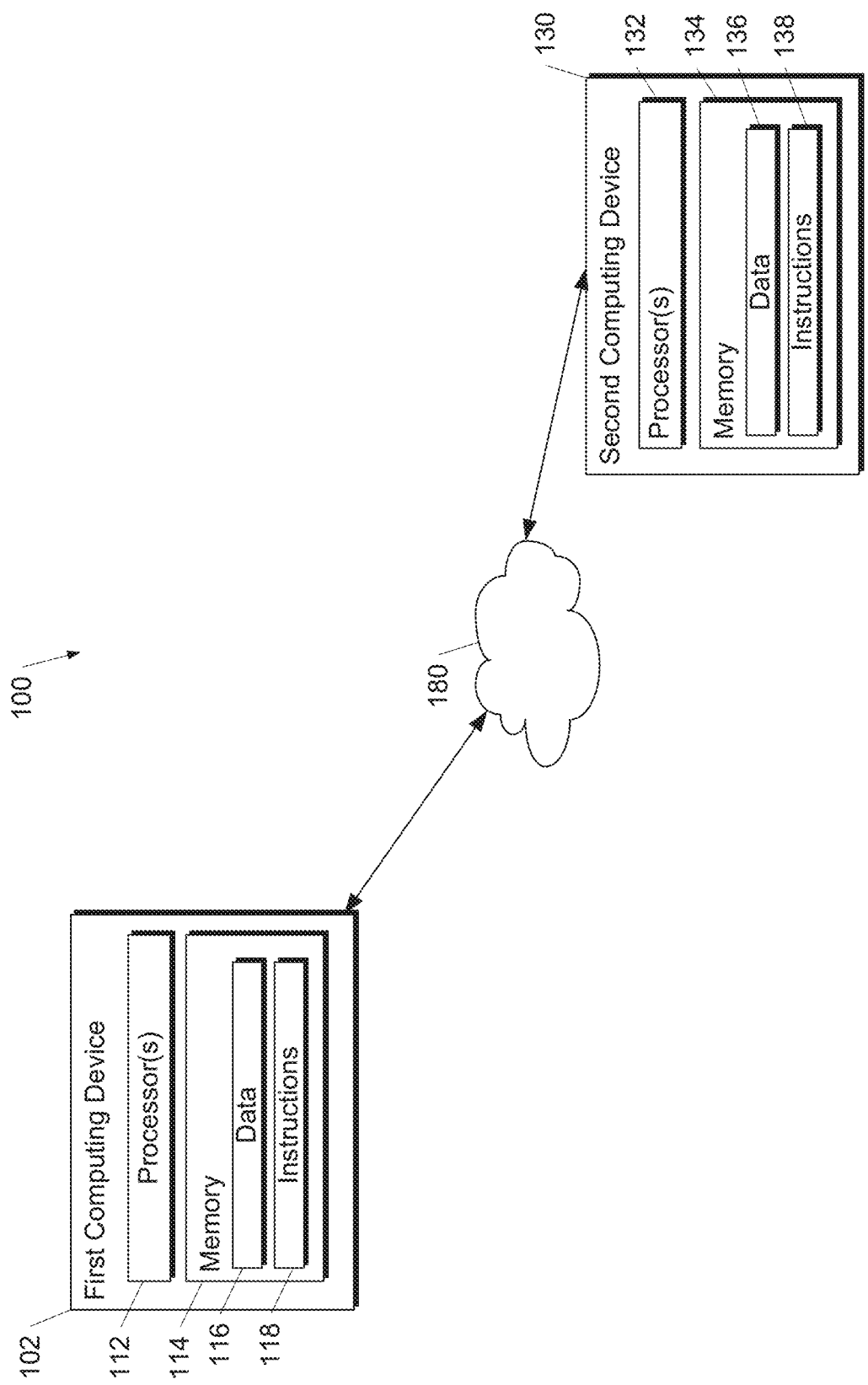

SYSTEMS AND METHODS FOR ANONYMIZING LARGE SCALE DATASETS

FIELD

The present disclosure relates generally to systems and methods for anonymizing large scale datasets. In particular, the present disclosure relates to anonymizing large scale datasets by k-anonymity.

BACKGROUND

Privacy in the form of formal privacy guarantees is often desirable in utilizing computer-readable data. One approach in privatizing data is k-anonymity. Algorithms for k-anonymity can be applied as a pre-processing technique that can be used to increase the privacy of data. A dataset is k-anonymous if the information about an entity in a dataset is indistinguishable from k entities in the dataset. To make a dataset k-anonymous typically includes either generalizing or removing data that is identifiable, so that in the final dataset any information is shared by at least k distinct entities.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for k-anonymizing a dataset to provide privacy guarantees for all columns in the dataset. The computer-implemented method can include obtaining, by a computing system including one or more computing devices, a dataset comprising data indicative of a plurality of entities and at least one data item respective to at least one of the plurality of entities. The computer-implemented method can include clustering, by the computing system, the plurality of entities into at least one entity cluster. The computer-implemented method can include determining, by the computing system, a majority condition for the at least one entity cluster, the majority condition indicating that the at least one data item is respective to at least a majority of the plurality of entities. The computer-implemented method can include assigning, by the computing system, the at least one data item to the plurality of entities in an anonymized dataset based at least in part on the majority condition.

Another example aspect of the present disclosure is directed to a computing system configured for k-anonymizing a dataset to provide privacy guarantees for all columns in the dataset. The computing system can include one or more processors and one or more memory devices storing computer-readable instructions that, when implemented, cause the one or more processors to perform operations. The operations can include obtaining a dataset including data indicative of a plurality of entities and at least one data item respective to at least one of the plurality of entities. The operations can include clustering the plurality of entities into at least one entity cluster. The operations can include determining a majority condition for the at least one entity cluster, the majority condition indicating that the at least one data item is respective to at least a majority of the plurality of entities. The operations can include assigning the at least one data item to the plurality of entities in an anonymized dataset based at least in part on the majority condition.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1 depicts a block diagram of an example computing system according to example embodiments of the present disclosure.

DETAILED DESCRIPTION

Figure 2A:
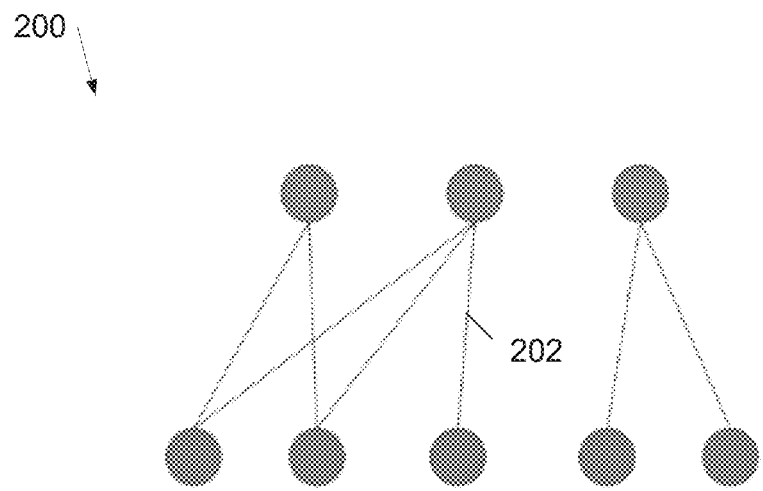
FIGS. 2A-2C depict example graphs according to example aspects of the present disclosure.

Generally, the present disclosure is directed to systems and methods for anonymizing large scale datasets, such as for k-anonymity. The datasets can be anonymized to preserve privacy of entities in the dataset. For example, a computing system can produce an anonymized dataset in which data for a particular entity (e.g., a user) is indistinguishable from data from k other entities. According to example aspects of the present disclosure, a system for producing an anonymized dataset can entity cluster entities and, in the anonymized dataset, assign a entity cluster of entities to a data item only if a majority of the entities in the entity cluster are assigned to the data item in the original dataset. Thus, the system can selectively add or remove relationships in the data to anonymize the data while maintaining a close approximation (e.g., by sparsity) to the original data and providing improved processing time.

One approach to providing privacy in datasets is differential privacy. Differential privacy relates to a property of a data processing algorithm and ensures that small changes in input (e.g., the presence or absence of any individual user) lead to minimal changes in output. Differentially private algorithms are generally randomized, and the uncertainty introduced by the randomization provides a layer of privacy guarantees. One primary advantage of differential privacy is that the output of a differentially private algorithm remains such even in the face of arbitrary post-processing by an adversary armed with additional side information about the users. However, this strong privacy guarantee comes at a cost, and many direct implementations of differential privacy (e.g., for working on sparse graphs) require large changes to the data structure (e.g., graph structure), such as by significantly densifying the graph and destroying the underlying signal. This can be especially detrimental in cases where the input data is sparse (e.g., a sparse graph).

Another approach to privacy is k-anonymity, a pre-processing technique that can be used to increase privacy of entities having data fields in the dataset. In particular, a dataset is considered to be k-anonymous if the information about an entity in a dataset is indistinguishable from k other entities. A dataset can be made k-anonymous by generalizing and/or removing data that is identifiable, such that in the final dataset any information is shared by at least k distinct users. This can be done as a preprocessing step, such as prior to data release and/or prior to using the data for any potentially nonsecure purpose, such as for training a machine learning model (e.g. a deep neural network).

In some cases, k-anonymity is defined in terms of so-called quasi-identifiers. Quasi-identifiers are columns in the data set that, combined, could be used to identify at least one entity in the dataset. A k-anonymous dataset is one where every user is indistinguishable from k other users with respect to the quasi-identifier set (e.g., the columns not corresponding to quasi-identifiers are not anonymized). Some approaches enforce other restrictions, such as requiring l-diversity or t-closeness for non-quasi-identifiers, on top of k-anonymity for quasi-identifiers. The choice of quasi-identifiers is crucial, as an attacker with even a small amount of information about an entity could easily de-anonymize a dataset, if the quasi-identifiers are not properly selected.

Example aspects of the present disclosure can provide for improved privacy guarantees over some existing methods, including k-anonymity of all columns in the dataset, as opposed to only of a subset of quasi-identifier columns. These privacy guarantees can be significant, as they preclude the existence of column data that, if released or guessed, could be used to break privacy of the dataset. For instance, example aspects of the present disclosure can provide for finding the best (e.g., best approximating the original data, such as by Jaccard similarity) smooth-k-anonymization of a dataset.

One example aspect of the present disclosure is directed to a computing system. The computing system can include one or more processors. For instance, the processor(s) can be configured to perform operations in response to computer-readable instructions. Additionally and/or alternatively, the computing system can include one or more memory devices that store computer-readable instructions. The processor(s) can implement the computer-readable instructions stored on the one or more memory-devices to perform operations such as, for instance, operations for a computer-implemented method for k-anonymizing a dataset to provide privacy guarantees for all columns in a dataset.

The operations and/or the computer-implemented method can include obtaining (e.g., by a computing system comprising one or more computing devices) a dataset including data indicative of a plurality of entities and at least one data item respective to at least one of the plurality of entities. For instance, in some embodiments, the dataset can be or can include parameter(s) of a machine-learned model, such as adjacency lists of machine-learned model parameters.

As one example, the dataset can be or can include tabular data where each row corresponds to an entity (e.g., a user) and each column corresponds to a particular feature (e.g., a particular data item). Additionally and/or alternatively, the dataset can be or can include list data. List data is common for machine learning applications, such as in graph adjacency lists, sparse matrix representations, etc. For instance, in some implementations, the dataset can be or can include an adjacency list between the entities and the data items, such as where a cell at a row-column pair contains a value representing relationship between the entity and data item of the row-column pair. For example, the dataset can be or can include a list of documents, links, images, interests, values, and/or other suitable data.

As another example, the dataset can be represented as and/or converted to a bipartite graph $G=(\{U \cup F\}, E)$ (e.g., based on tabular data). For instance, the left side node set U can correlate to the rows of the tabular dataset and the right side F can correlate to the columns of the tabular dataset. The edges E correspond to entries in the table. For instance, if a row-column pair has a value in the tabular dataset, this value can exist as an edge in the bipartite graph. Additionally and/or alternatively, the dataset may be provided directly as a bipartite graph. Some example aspects of the present disclosure are discussed with regard to notation of bipartite graphs for the purposes of illustration. One of ordinary skill in the art will recognize that other data formats (e.g., operating directly on tabular data) are within the scope of the present disclosure. For example, the dataset can be arbitrary binary matrices, data represented as a series of lists, hyper graphs, networks (e.g., network graphs, neural networks, etc.), and/or any other suitable data. Additionally, the operations used herein can be implemented using any suitable data transforms for the appropriate type of data. For example, assigning an edge to a bipartite graph and a value in a row-column combination of a tabular list may be analogous operations.

The dataset can be or can include data that is desirably anonymized, such as sparse data that is desirably anonymized. As one example, the dataset can include federated learning training data. The federated learning training data may be anonymized before being transmitted to and/or otherwise processed by a centralized learner. As another example, the dataset can include personally identifiable information, such as medical data and/or health data (e.g., a user's medical history), internet usage data (e.g., passwords, browsing history, etc.).

Additionally and/or alternatively, the operations and/or the computer-implemented method can include clustering (e.g., by the computing system) the plurality of entities into at least one entity cluster. The size of each entity cluster (e.g., the number of entities included in each cluster) can be at least k.

As one example, clustering the plurality of entities can include mapping the plurality of entities and the at least one feature to a plurality of points in a dimensional space, such as an m dimensional space. For instance, each entity can be represented as a point in the dimensional space, where a location of the point is based on which of the features the entity is associated with (e.g., includes an edge for). As one example, m can correspond to a total number of features, such as a number of columns in a tabular dataset and/or a number of unique data items. A value of the point in a particular dimension can be related to the data item corresponding to the dimension. For example, in some implementations, a value of the point in a dimension can be one if the entity corresponding to the point is associated with (e.g., shares an edge with) the data item corresponding to the dimension and/or can be zero if the entity is not associated with (e.g., does not share an edge with) the data item. As another example, if the entity is a member of a list of entities sharing an edge with a data item, the entity can have a nonzero value in a dimension corresponding to the data item.

Additionally and/or alternatively, in some embodiments, clustering the plurality of entities can include establishing one or more centers in the dimensional space. Additionally and/or alternatively, clustering the plurality of entities can include distributing the plurality of entity clusters among the one or more centers based at least in part on distances between the plurality of points and the one or more centers.

As one example, the plurality of entities can be distributed among the one or more centers by a lower-bounded r-median approach. The lower-bounded r-median approach can include selecting at most r centers from n points (e.g., each respective to an entity) and assigning each point to one center such that the number of points assigned to each center is at least k and/or the total distance of the points from their assigned centers is minimized. Each set of points assigned to the same center can be considered an entity cluster. In some implementations, at least k points can be assigned to each center. As many centers as necessary can be used (e.g., a number of centers r can equal a number of points n), so long as at least k points are assigned to each center.

Additionally and/or alternatively, clustering the plurality of entities can include a metric facility location approach. In the metric facility location approach, a set of points (e.g., each corresponding to an entity) is compared to a set of facilities in a metric. Each facility has an opening cost. For example, clustering the plurality of entities can include determining an opening cost for each facility based at least in part on one or more distances to other points of the plurality of points. A set of facilities is selected and points are assigned to the facilities such that the total opening cost of selected facilities plus the total distance of points from their assigned facilities is minimized and/or nearly minimized. The set of points assigned to each facility can be an entity cluster (e.g., the set of entities respective to the points).

For instance, the metric facility location approach can include, for each point, providing a facility at a location (e.g., same location) of the point. The facility can have an opening cost based at least in part on distances to some or all other points. As one example, the opening cost can be $2\alpha/1-\alpha * \Sigma_{u' \in U_i^k} \text{Dist}(u', u_i)$ where $u_i$ is a point, $U_i^k$ is the set of k closest points to $u_i$, $\alpha$ is a parameter between 0 and 1 representing a bicriteria factor, and $\text{Dist}(u', u_i)$ is a distance between the points (e.g., a distance cost for the metric). In some embodiments, the $\alpha/1-\alpha$ multiplicand may be omitted, such as if the bicriteria factor is unknown.

The metric facility location approach can include assigning each point to an entity cluster associated with a facility such that a total cost is minimized. The total cost can include at least opening costs of each facility with at least one assigned point. Additionally and/or alternatively, the total cost can include distance costs between the assigned points and the facility. For instance, after establishing the facilities, the metric facility location approach can include solving the facility locations to assign each point to a facility such that the total cost of the points (e.g., opening cost of any facility with one or more assigned points and/or distance cost) is minimized or nearly minimized.

In some embodiments, small entity clusters (e.g., having size less than $\alpha$k) can be iteratively assigned to a next nearest entity cluster (e.g., having a nearest facility to the facility of the small entity cluster). For example, clustering the entities can include assigning an entity cluster having a size less than $\alpha$k to a next nearest entity cluster.

In some embodiments, clustering the entities can include merging a first entity cluster with a second entity cluster such that each entity cluster has a size greater than k. Additionally and/or alternatively, the entity clusters can be merged such that a size of each entity cluster is less than 2k. In some embodiments, clustering the entities can further include splitting an entity cluster into a plurality of smaller entity clusters prior to merging the first entity cluster with the second entity cluster such that each entity cluster has a size greater than k, where at least one of the first entity cluster or the second entity cluster is one of the plurality of smaller entity clusters.

For example, after the points are assigned to facilities to form entity clusters, the metric facility location approach can include merging entity clusters having size less than k (e.g., fewer than k points assigned to the facilities). The entity clusters can be arbitrarily paired and/or merged. In some implementations, the entity clusters can be merged until some or all entity clusters have sizes between k and 2k. Additionally and/or alternatively, in some cases, entity clusters with sizes greater than 2k can be split into two or more entity clusters. Furthermore, in some implementations, such as if not enough entity clusters with sizes less than k exist to merge such that all entity clusters have a size at least k and/or greater than k, large entity clusters (e.g., entity clusters with sizes greater than k, such as greater than 2k) can be split into smaller entity clusters of size $\alpha$k so that the size of all smaller entity clusters can be made at least k and/or greater than k.

Additionally and/or alternatively, the operations and/or the computer-implemented method can include determining (e.g., by the computing system) a majority condition for the at least one entity cluster. The majority condition can be respective to a data item. For instance, the majority condition can indicate that the at least one data item is respective to (e.g., shares an edge with) at least a majority of the plurality of entities. For example, the majority can be at least half of the plurality of entities. As one example, if at least half of the entities in an entity cluster are associated with, such as by sharing an edge with, a data item, the entity cluster can be considered to have a majority condition for the data item. Additionally and/or alternatively, the majority condition may be negative (e.g., that fewer than half of the entities are associated with the data item).

Additionally and/or alternatively, the operations and/or the computer-implemented method can include assigning (e.g., by the computing system) the at least one data item to the plurality of entities in an anonymized dataset based at least in part on the majority condition. The anonymized dataset can be an approximation of the original (e.g., non-anonymized) dataset, such as a k-anonymized approximate dataset. For instance, in some embodiments, the anonymized dataset can include each of the plurality of entities and the at least one data item. Relationships (e.g., edges) between the plurality of entities and the at least one data item are changed slightly to anonymize the dataset, but the anonymized dataset can substantially preserve sparsity and/or other characteristics of the original dataset. A particular entity's data can be indistinguishable from k other entities in the anonymized dataset. In particular, in some implementations, the anonymized dataset can be k-smooth-anonymized. A graph G' (e.g., an anonymized dataset) is k-smooth-anonymized from a graph G (e.g., an original dataset) if each entity in G' is identical to k users in neighborhood and, for each equivalence class of entities in G' (by neighborhood), at least half of the edges from those nodes are from G.

As one example, the data item(s) can be assigned to each of the plurality of entities in an entity cluster based on a majority condition indicating that a majority of the entities in the entity cluster are assigned to the data item. For instance, if a majority of the entities in the entity cluster share edges with the data item, additional edges can be introduced (e.g., relative to the original dataset) between the rest of the entities in the entity cluster and the data item such that each entity shares an edge with the data item in the anonymized dataset. Additionally and/or alternatively, if a majority of entities in an entity cluster are not assigned to the data item (e.g., do not share edges), then none of the entities in the entity cluster will be assigned to the data item in the anonymized dataset. For instance, the edges between the entities and data items can be removed (e.g., relative to the original dataset) in the anonymized dataset.

Additionally and/or alternatively, in some embodiments, the operations and/or the computer-implemented method can include distributing (e.g., by the computing system) the anonymized dataset to an external computing system. For example, the anonymized dataset can be transmitted from a first computing system to a second computing system. The anonymized dataset can be distributed while protecting entities in the anonymized dataset from privacy violations from potentially adversarial parties at the external computing system.

Example aspects of the present disclosure can provide for a number of technical effects and benefits. For example, aspects of the present disclosure can provide for obtaining a dataset including data indicative of a plurality of entities and at least one data item respective to at least one of the plurality of entities, clustering the plurality of entities into at least one entity cluster, determining a majority condition for the at least one entity cluster, the majority condition indicating that the at least one data item is respective to at least a majority of the plurality of entities, and assigning the at least one data item to the plurality of entities in an anonymized dataset based at least in part on the majority condition to produce an anonymized dataset that approximates the original dataset while having a k-anonymity characteristic such that data for an entity in the anonymized dataset is indistinguishable from k other entities in the anonymized dataset. This can preserve privacy of the entities in the dataset while maintaining utility of the dataset. Additionally, systems and methods according to example aspects of the present disclosure can provide privacy guarantees for all columns in a dataset, beyond simply a select group of quasi-identifiers. This can provide for improved privacy of the anonymized dataset, especially in cases where adversaries are not expected to have access to information beyond that of the dataset.

Additionally, the systems and methods can provide for improvements in computing technology. For instance, aspects of the present disclosure can provide for obtaining a dataset including data indicative of a plurality of entities and at least one data item respective to at least one of the plurality of entities, clustering the plurality of entities into at least one entity cluster, determining a majority condition for the at least one entity cluster, the majority condition indicating that the at least one data item is respective to at least a majority of the plurality of entities, and assigning the at least one data item to the plurality of entities in an anonymized dataset based at least in part on the majority condition to produce an anonymized dataset in polynomial time, whereas optimal algorithms for making a dataset k-anonymous while best preserving utility can solve NP-hard problems and thus be infeasible in polynomial time. For example, many current approximation algorithms offer the guarantee of removing at most $O(\log(k))$ times more elements than that of an optimal solution. However, such a bound is vacuous when the optimal solution has to remove a constant fraction of the dataset, in which case even an algorithm that just returns a null dataset achieves the same guarantee. Thus, it can be seen that systems and methods according to the present disclosure can provide a solution in polynomial time that maintains usability of the dataset.

Furthermore, the system and methods according to example aspects of the present disclosure can produce anonymized datasets that more closely approximate the original datasets than conventional systems and methods. For example, a Jaccard similarity between the original dataset and a dataset anonymized by systems and methods of the present disclosure can be greater than between the original dataset and a conventionally k-anonymized dataset, in addition to and/or alternatively to an improved privacy guarantee and/or reduced evaluation time.

Systems and methods according to example aspects of the present disclosure can be especially beneficial in situations where the dataset is sparse, such as when a number of nodes, such as entities and/or data items, greatly outnumbers an average number of edges per node and/or where most nodes have fewer than about five edges, such as fewer than about two edges, such as fewer than one edge. As another example, sparse data can have a low average number of edges per node (e.g., less than about one). In these cases, many conventional anonymization algorithms can be overly destructive on the original dataset. For instance, many conventional anonymization algorithms, such as differential privacy algorithms and/or conventional k-anonymization algorithms, will delete edges that offend k-anonymity, which in many sparse graphs can be nearly every edge. Additionally and/or alternatively, some conventional k-anonymization algorithms can add significantly more nonexisting edges, which can destroy sparsity and/or usability of the data. However, example aspects of the present disclosure provide for clustering entities and assigning entities to data items based on a majority condition in the entity cluster, such that edges can be added as well as removed, and the addition and/or removal of edges is performed on similar entities.

Example aspects of the present disclosure can find applications in a variety of applications in which anonymized data is required, and especially in applications where the data is spare. Example applications include, but are not limited to, federated learning (e.g., anonymizing training data used in federated learning), anonymizing user-identifiable information (e.g., anonymizing data for a plurality of users such that an individual user cannot be identified from the data), such as for anonymizing user medical/health information, internet usage information, and/or other sensitive information, validating leaked passwords, and/or any other suitable use.

With reference now to the Figures, example embodiments of the present disclosure will be discussed in further detail.

FIG. 1 depicts a block diagram of an example computing system 100 that performs anonymization according to example embodiments of the present disclosure. The system 100 includes a first computing system 102 and a second computing system 130 that are communicatively coupled over a network 180.

The first computing system 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

In some implementations, the first computing system 102 includes or is otherwise implemented by one or more server computing devices. In instances in which the second computing system 130 includes plural server computing devices, such server computing devices can operate according to sequential computing architectures, parallel computing architectures, or some combination thereof.

The first computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the first computing system 102 to perform operations.

The first computing system 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The second computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the second computing system 130 to perform operations.

The second computing system 130 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

In some implementations, the second computing system 130 includes or is otherwise implemented by one or more server computing devices. In instances in which the second computing system 130 includes plural server computing devices, such server computing devices can operate according to sequential computing architectures, parallel computing architectures, or some combination thereof.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

For instance, in some embodiments, one of the first or second computing systems 102, 130 can obtain a dataset and anonymize the dataset according to example aspects of the present disclosure The one of the first or second computing systems 102, 130 can then distribute the anonymized dataset to the other of the first or second computing systems 102, 130 (e.g., by network 180). The anonymized dataset can be distributed while protecting entities in the anonymized dataset from privacy violations from potentially adversarial parties at the other of the first or second computing systems 102, 130.

Figure 2B:
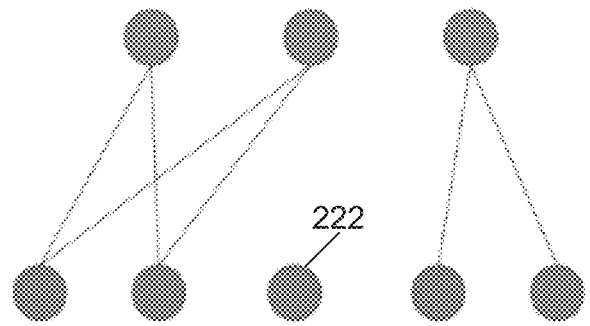
Figure 2C:
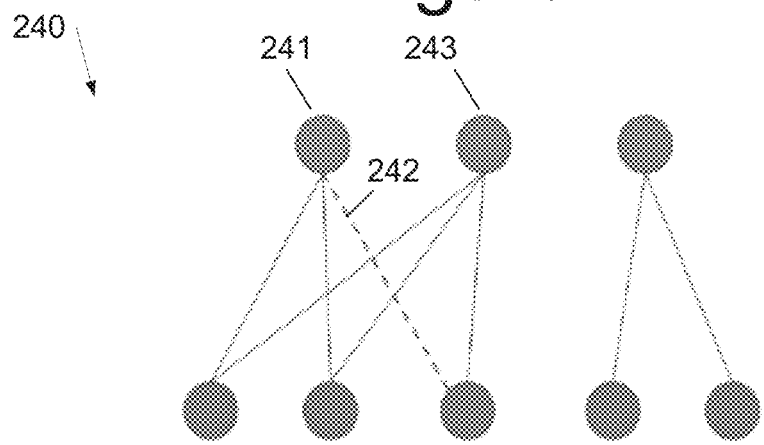

FIGS. 2A-2C depict example graphs 200, 220, and 240 according to example aspects of the present disclosure. For example, the graph 200 can correspond to an original dataset and graphs 220 and 240 can correspond to anonymized datasets. For instance, graph 200 is not k-anonymous. As an example, an adversary may be able to recognize some nodes in the graph 200 by the presence of edge 202, which uniquely describes the nodes to which it is connected. Additionally, from that knowledge, other nodes can be identified.

Graph 220 solves this by removing edge 202 to form a k-anonymized graph. However, the removal of edge 202 has left node 222 with no connected edges. While this may be allowable in some instances, in cases where the dataset is sparse (e.g., the graph has few edges relative to nodes), the removal of edges can destroy integrity of the anonymized dataset (e.g., may reduce the dataset to null or nearly null).

Graph 240 depicts a k-smooth-anonymized graph 240 that can be produced, for example, according to example aspects of the present disclosure. As illustrated in graph 240, instead of removing edge 202 as in graph 220, a new edge 242 is added to the graph 240. This allows for nodes 241 and 243 to have indistinguishable data, satisfying k-anonymity, but is accomplished by adding edges in a majority condition according to example aspects of the present disclosure. This can allow for improved performance in, for example, sparse graphs, in addition to and/or alternatively to improved privacy guarantees and/or reduced runtime.

Figure 3:
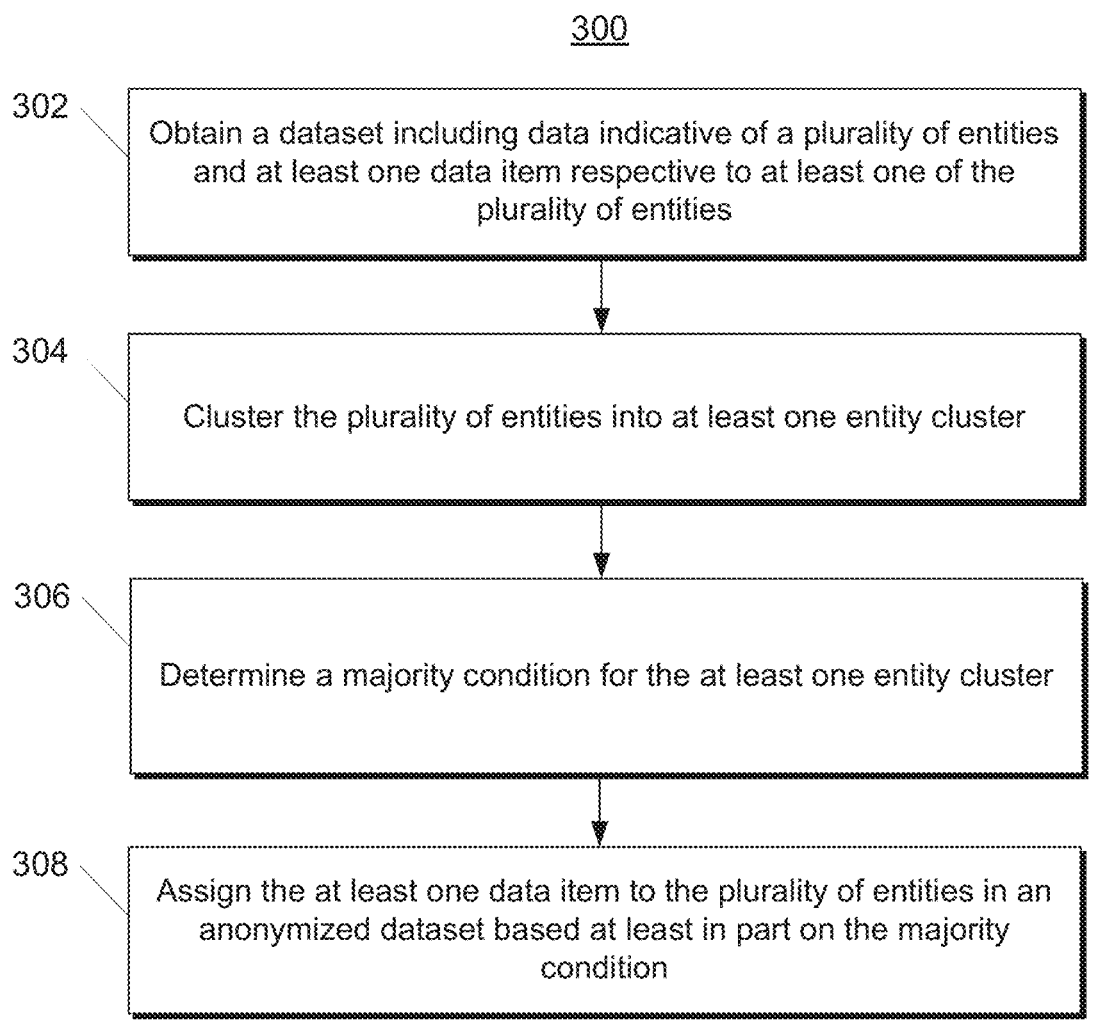
FIG. 3 depicts a flow chart diagram of an example computer-implemented method to perform data anonymization according to example embodiments of the present disclosure Reference numerals that are repeated across plural figures are intended to identify the same features in various implementations.

FIG. 3 depicts a flow chart diagram of an example computer-implemented method 300 to perform data anonymization according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

The computer-implemented method 300 can include, at 302, obtaining (e.g., by a computing system comprising one or more computing devices) a dataset including data indicative of a plurality of entities and at least one data item respective to at least one of the plurality of entities. For instance, in some embodiments, the dataset can be or can include parameter(s) of a machine-learned model, such as adjacency lists of machine-learned model parameters.

As one example, the dataset can be or can include tabular data where each row corresponds to an entity (e.g., a user) and each column corresponds to a particular feature (e.g., a particular data item). Additionally and/or alternatively, the dataset can be or can include list data. List data is common for machine learning applications, such as in graph adjacency lists, sparse matrix representations, etc. For instance, in some implementations, the dataset can be or can include an adjacency list between the entities and the data items, such as where a cell at a row-column pair contains a value representing relationship between the entity and data item of the row-column pair. For example, the dataset can be or can include a list of documents, links, images, interests, values, and/or other suitable data.

As another example, the dataset can be represented as and/or converted to a bipartite graph $G=(\{U \cup F\}, E)$ (e.g., based on tabular data). For instance, the left side node set U can correlate to the rows of the tabular dataset and the right side F can correlate to the columns of the tabular dataset. The edges E correspond to entries in the table. For instance, if a row-column pair has a value in the tabular dataset, this value can exist as an edge in the bipartite graph. Additionally and/or alternatively, the dataset may be provided directly as a bipartite graph. Some example aspects of the present disclosure are discussed with regard to notation of bipartite graphs for the purposes of illustration. One of ordinary skill in the art will recognize that other data formats (e.g., operating directly on tabular data) are within the scope of the present disclosure. For example, the dataset can be arbitrary binary matrices, data represented as a series of lists, hyper graphs, networks (e.g., network graphs, neural networks, etc.), and/or any other suitable data. Additionally, the operations used herein can be implemented using any suitable data transforms for the appropriate type of data. For example, assigning an edge to a bipartite graph and a value in a row-column combination of a tabular list may be analogous operations.

Additionally and/or alternatively, the computer-implemented method 300 can include, at 304, clustering (e.g., by the computing system) the plurality of entities into at least one entity cluster. The size of each entity cluster (e.g., the number of entities included in each cluster) can be at least k.

As one example, clustering the plurality of entities can include mapping the plurality of entities and the at least one feature to a plurality of points in a dimensional space, such as an m dimensional space. For instance, each entity can be represented as a point in the dimensional space, where a location of the point is based on which of the features the entity is associated with (e.g., includes an edge for). As one example, m can correspond to a total number of features, such as a number of columns in a tabular dataset and/or a number of unique data items. A value of the point in a particular dimension can be related to the data item corresponding to the dimension. For example, in some implementations, a value of the point in a dimension can be one if the entity corresponding to the point is associated with (e.g., shares an edge with) the data item corresponding to the dimension and/or can be zero if the entity is not associated with (e.g., does not share an edge with) the data item. As another example, if the entity is a member of a list of entities sharing an edge with a data item, the entity can have a nonzero value in a dimension corresponding to the data item.

Additionally and/or alternatively, in some embodiments, clustering the plurality of entities can include establishing one or more centers in the dimensional space. Additionally and/or alternatively, clustering the plurality of entities can include distributing the plurality of entity clusters among the one or more centers based at least in part on distances between the plurality of points and the one or more centers.

As one example, the plurality of entities can be distributed among the one or more centers by a lower-bounded r-median approach. The lower-bounded r-median approach can include selecting at most r centers from n points (e.g., each respective to an entity) and assigning each point to one center such that the number of points assigned to each center is at least k and/or the total distance of the points from their assigned centers is minimized. Each set of points assigned to the same center can be considered an entity cluster. In some implementations, at least k points can be assigned to each center. As many centers as necessary can be used (e.g., a number of centers r can equal a number of points n), so long as at least k points are assigned to each center.

Additionally and/or alternatively, clustering the plurality of entities can include a metric facility location approach. In the metric facility location approach, a set of points (e.g., each corresponding to an entity) is compared to a set of facilities in a metric. Each facility has an opening cost. For example, clustering the plurality of entities can include determining an opening cost for each facility based at least in part on one or more distances to other points of the plurality of points. A set of facilities is selected and points are assigned to the facilities such that the total opening cost of selected facilities plus the total distance of points from their assigned facilities is minimized and/or nearly minimized. The set of points assigned to each facility can be an entity cluster (e.g., the set of entities respective to the points).

For instance, the metric facility location approach can include, for each point, providing a facility at a location (e.g., same location) of the point. The facility can have an opening cost based at least in part on distances to some or all other points. As one example, the opening cost can be $2\alpha/1-\alpha * \Sigma_{u' \in U_i^k} \text{Dist}(u', u_i)$ where $u_i$ is a point, $U_i^k$ is the set of k closest points to $u_i$, $\alpha$ is a bicriteria factor, and $\text{Dist}(u', u_i)$ is a distance between the points (e.g., a distance cost for the metric). In some embodiments, the $\alpha/1-\alpha$ multiplicand may be omitted, such as if the bicriteria factor is unknown.

The metric facility location approach can include assigning each point to an entity cluster associated with a facility such that a total cost is minimized. The total cost can include at least opening costs of each facility with at least one assigned point. Additionally and/or alternatively, the total cost can include distance costs between the assigned points and the facility. For instance, after establishing the facilities, the metric facility location approach can include solving the facility locations to assign each point to a facility such that the total cost of the points (e.g., opening cost of any facility with one or more assigned points and/or distance cost) is minimized or nearly minimized.

In some embodiments, small entity clusters (e.g., having size less than $\alpha k$) can be iteratively assigned to a next nearest entity cluster (e.g., having a nearest facility to the facility of the small entity cluster). For example, clustering the entities can include assigning an entity cluster having a size less than $\alpha k$ to a next nearest entity cluster. For instance, $\alpha$ can represent a minimum fraction of k points that is required as a threshold for the size of the cluster for being accepted as a cluster in a final set of clusters.

In some embodiments, clustering the entities can include merging a first entity cluster with a second entity cluster such that each entity cluster has a size greater than k. Additionally and/or alternatively, the entity clusters can be merged such that a size of each entity cluster is less than 2k. In some embodiments, clustering the entities can further include splitting an entity cluster into a plurality of smaller entity clusters prior to merging the first entity cluster with the second entity cluster such that each entity cluster has a size greater than k, where at least one of the first entity cluster or the second entity cluster is one of the plurality of smaller entity clusters.

For example, after the points are assigned to facilities to form entity clusters, the metric facility location approach can include merging entity clusters having size less than k (e.g., fewer than k points assigned to the facilities). The entity clusters can be arbitrarily paired and/or merged. In some implementations, the entity clusters can be merged until some or all entity clusters have sizes between k and 2k. Additionally and/or alternatively, in some cases, entity clusters with sizes greater than 2k can be split into two or more entity clusters. Furthermore, in some implementations, such as if not enough entity clusters with sizes less than k exist to merge such that all entity clusters have a size at least k and/or greater than k, large entity clusters (e.g., entity clusters with sizes greater than k, such as greater than 2k) can be split into smaller entity clusters of size αk so that the size of all smaller entity clusters can be made at least k and/or greater than k.

Additionally and/or alternatively, the computer-implemented method 300 can include, at 306, determining (e.g., by the computing system) a majority condition for the at least one entity cluster. The majority condition can be respective to a data item. For instance, the majority condition can indicate that the at least one data item is respective to (e.g., shares an edge with) at least a majority of the plurality of entities. For example, the majority can be at least half of the plurality of entities. As one example, if at least half of the entities in an entity cluster are associated with, such as by sharing an edge with, a data item, the entity cluster can be considered to have a majority condition for the data item. Additionally and/or alternatively, the majority condition may be negative (e.g., that fewer than half of the entities are associated with the data item).

Additionally and/or alternatively, the computer-implemented method 300 can include, at 308, assigning (e.g., by the computing system) the at least one data item to the plurality of entities in an anonymized dataset based at least in part on the majority condition. The anonymized dataset can be an approximation of the original (e.g., non-anonymized) dataset, such as a k-anonymized approximate dataset. For instance, in some embodiments, the anonymized dataset can include each of the plurality of entities and the at least one data item. Relationships (e.g., edges) between the plurality of entities and the at least one data item are changed slightly to anonymize the dataset, but the anonymized dataset can substantially preserve sparsity and/or other characteristics of the original dataset. A particular entity's data can be indistinguishable from k other entities in the anonymized dataset. In particular, in some implementations, the anonymized dataset can be k-smooth-anonymized. A graph G' (e.g., an anonymized dataset) is k-smooth-anonymized from a graph G (e.g., an original dataset) if each entity in G' is identical to k users in neighborhood and, for each equivalence class of entities in G' (by neighborhood), at least half of the edges from those nodes are from G.

As one example, the data item(s) can be assigned to each of the plurality of entities in an entity cluster based on a majority condition indicating that a majority of the entities in the entity cluster are assigned to the data item. For instance, if a majority of the entities in the entity cluster share edges with the data item, additional edges can be introduced (e.g., relative to the original dataset) between the rest of the entities in the entity cluster and the data item such that each entity shares an edge with the data item in the anonymized dataset. Additionally and/or alternatively, if a majority of entities in an entity cluster are not assigned to the data item (e.g., do not share edges), then none of the entities in the entity cluster will be assigned to the data item in the anonymized dataset. For instance, the edges between the entities and data items can be removed (e.g., relative to the original dataset) in the anonymized dataset.

Additionally and/or alternatively, in some embodiments, the computer-implemented method 300 can include distributing (e.g., by the computing system) the anonymized dataset to an external computing system. For example, the anonymized dataset can be transmitted from a first computing system to a second computing system. The anonymized dataset can be distributed while protecting entities in the anonymized dataset from privacy violations from potentially adversarial parties at the external computing system.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for k-anonymizing a dataset to provide privacy guarantees for all columns in the dataset, the computer-implemented method comprising:
   obtaining, by a computing system comprising one or more computing devices, a dataset comprising data indicative of a plurality of entities and at least one data item respective to at least one of the plurality of entities;
   clustering, by the computing system, the plurality of entities into at least one entity cluster by mapping the plurality of entities and the at least one data item to a plurality of points in a dimensional space, wherein the at least one of the plurality of entities is represented as a point from among the plurality of points in the dimensional space with a value related to the at least one data item;
   determining, by the computing system, a majority condition for the at least one entity cluster, the majority condition indicating that the at least one data item is respective to at least a majority of the plurality of entities; and
   assigning, by the computing system, the at least one data item to the plurality of entities in an anonymized dataset based at least in part on the majority condition.

2. The computer-implemented method of claim 1, further comprising distributing, by the computing system, the anonymized dataset to an external computing system.

3. The computer-implemented method of claim 1, wherein the dataset comprises federated learning training data.

4. The computer-implemented method of claim 1, wherein the dataset comprises personally identifiable information.

5. The computer-implemented method of claim 1, wherein the dataset comprises bipartite graph data.

6. The computer-implemented method of claim 1, wherein the dataset comprises parameters of a machine-learned model.

7. The computer-implemented method of claim 1, wherein clustering the plurality of entities comprises:
establishing one or more centers in the dimensional space;
distributing the plurality of entities among the one or more centers based at least in part on a plurality of distances between the plurality of points and the one or more centers.

8. The computer-implemented method of claim 7, wherein distributing the plurality of entities among the one or more centers comprises:
selecting the one or more centers from the plurality of points; and
assigning each point of the plurality of points to a center of the one or more centers such that a total distance of the points from their assigned centers is minimized.

9. The computer-implemented method of claim 8, wherein at least k points are assigned to each center of the one or more centers, wherein k is a number of entities from which data for each entity of the plurality of entities is indistinguishable.

10. The computer-implemented method of claim 1, wherein clustering the plurality of entities comprises:
providing a plurality of facilities each respective to a point of the plurality of points;
determining an opening cost for each facility based at least in part on one or more distances to other points of the plurality of points;
assigning each point to an entity cluster associated with a facility such that a total cost is minimized, the total cost comprising at least opening costs of each facility with at least one assigned point.

11. The computer-implemented method of claim 10, further comprising:
assigning an entity cluster having a size less than $\alpha k$ to a next nearest entity cluster, where $\alpha$ is an expected number of entities associated with each data item and k is a number of entities from which data for each entity of the plurality of entities is indistinguishable.

12. The computer-implemented method of claim 10, further comprising merging a first entity cluster with a second entity cluster such that each entity cluster has a size greater than k, wherein k is a number of entities from which data for each entity of the plurality of entities is indistinguishable.

13. The computer-implemented method of claim 12, wherein a size of each entity cluster is less than 2k.

14. The computer-implemented method of claim 12, further comprising splitting an entity cluster into a plurality of smaller entity clusters prior to merging the first entity cluster with the second entity cluster such that each entity cluster has a size greater than k, where at least one of the first entity cluster or the second entity cluster is one of the plurality of smaller entity clusters.

15. A computing system configured for k-anonymizing a dataset to provide privacy guarantees for all columns in the dataset, the computing system comprising:
one or more processors; and
one or more memory devices storing computer-readable instructions that, when implemented, cause the one or more processors to perform operations, the operations comprising:
obtaining a dataset comprising data indicative of a plurality of entities and at least one data item respective to at least one of the plurality of entities;
clustering the plurality of entities into at least one entity cluster by mapping the plurality of entities and the at least one data item to a plurality of points in a dimensional space, wherein the at least one of the plurality of entities is represented as a point from among the plurality of points in the dimensional space with a value related to the at least one data item;
determining a majority condition for the at least one entity cluster, the majority condition indicating that the at least one data item is respective to at least a majority of the plurality of entities; and
assigning the at least one data item to the plurality of entities in an anonymized dataset based at least in part on the majority condition.

16. The computing system of claim 15, wherein clustering the plurality of entities comprises:
establishing one or more centers in the dimensional space;
distributing the plurality of entities among the one or more centers based at least in part on a plurality of distances between the plurality of points and the one or more centers.

17. The computing system of claim 16, wherein distributing the plurality of entities among the one or more centers comprises:
selecting the one or more centers from the plurality of points; and
assigning each point of the plurality of points to a center of the one or more centers such that a total distance of the points from their assigned centers is minimized.

18. The computing system of claim 17, wherein at least k points are assigned to each center of the one or more centers, wherein k is a number of entities from which data for each entity of the plurality of entities is indistinguishable.

19. The computing system of claim 15, wherein clustering the plurality of entities comprises:
providing a plurality of facilities each respective to a point of the plurality of points;
determining an opening cost for each facility based at least in part on one or more distances to other points of the plurality of points;
assigning each point to an entity cluster associated with a facility such that a total cost is minimized, the total cost comprising at least opening costs of each facility with at least one assigned point.

20. The computing system of claim 19, further comprising merging a first entity cluster with a second entity cluster such that each entity cluster has a size greater than k, wherein k is a number of entities from which data for each entity of the plurality of entities is indistinguishable.

* * * * *